(12) United States Patent  (10) Patent No.: US 11,938,571 B2
Hotz  (45) Date of Patent: Mar. 26, 2024

(54) METHODS AND APPARATUSES FOR A VENTILATION NOZZLE FOR WELDING APPLICATIONS

(71) Applicant: Illinois Tool Works Inc., Glenview, IL (US)

(72) Inventor: Michael A. Hotz, Owen Sound (CA)

(73) Assignee: Illinois Tool Works Inc., Glenview, IL (US)

( * ) Notice: Subject to any disclaimer, the term of this patent is extended or adjusted under 35 U.S.C. 154(b) by 609 days.

(21) Appl. No.: 17/062,975

(22) Filed: Oct. 5, 2020

(65) Prior Publication Data

US 2021/0146487 A1  May 20, 2021

Related U.S. Application Data

(60) Provisional application No. 62/936,773, filed on Nov. 18, 2019.

(51) Int. Cl.
*B23K 37/00* (2006.01)

(52) U.S. Cl.
CPC ................. *B23K 37/006* (2013.01)

(58) Field of Classification Search
CPC ....... B23K 37/006; B23K 9/285; B23K 9/325
USPC .................................... 219/137.41
See application file for complete search history.

(56) References Cited

U.S. PATENT DOCUMENTS

| 497,903 | A | * | 5/1893 | Aalto et al. | ........... | F03B 11/004 |
| | | | | | | 239/455 |
| 6,998,575 | B1 | | 2/2006 | Kensrue | | |
| 7,258,285 | B1 | | 8/2007 | Combs | | |
| 8,592,710 | B2 | * | 11/2013 | Klangos | ................. | B23K 9/325 |
| | | | | | | 219/137.41 |
| 2006/0226136 | A1 | | 10/2006 | Zamuner | | |
| 2009/0230107 | A1 | | 9/2009 | Ertmer | | |
| 2009/0321403 | A1 | | 12/2009 | Brenneke | | |
| 2014/0091486 | A1 | | 4/2014 | Watson | | |
| 2018/0339358 | A1 | * | 11/2018 | Hattingh | ................ | B23K 9/164 |
| 2019/0001381 | A1 | | 1/2019 | Hattingh | | |

FOREIGN PATENT DOCUMENTS

| CN | 202638836 | 1/2013 |
|---|---|---|
| CN | 108393564 | 8/2018 |
| CN | 110248761 | 9/2019 |
| DE | 102018007686 | 3/2019 |
| EP | 2556913 | 2/2013 |
| EP | 3300827 | 4/2018 |
| GB | 1393561 | 5/1975 |
| GB | 1496275 | 12/1977 |
| GB | 2004488 | 4/1979 |

(Continued)

*Primary Examiner* — Dana Ross
*Assistant Examiner* — James F Sims, III
(74) *Attorney, Agent, or Firm* — McAndrews, Held & Malloy, Ltd.

(57) ABSTRACT

Provided is a disclosure for a ventilation conduit for a welding torch, where the ventilation conduit comprises a conduit body comprising at least a first part and a second part, and a conduit nozzle. The first part and the second part are configured to be removably coupled to each other around an outside of a welding torch. The conduit nozzle, with a first end that is beveled and a second end, is configured to be removably coupled by the second end to the conduit body.

17 Claims, 7 Drawing Sheets

(56) References Cited

FOREIGN PATENT DOCUMENTS

| | | |
|---|---|---|
| JP | H01186281 | 7/1989 |
| JP | H06182555 | 7/1994 |
| JP | 2008036693 | 2/2008 |
| KR | 101996523 | 7/2019 |

\* cited by examiner

METHODS AND APPARATUSES FOR A VENTILATION NOZZLE FOR WELDING APPLICATIONS

CROSS REFERENCE/PRIORITY TO RELATED APPLICATIONS

This application claims priority to, and the benefit of, U.S. Provisional Application No. 62/936,773, titled "Methods and Apparatuses for a Ventilation Nozzle for Welding Applications," filed Nov. 18, 2019, the entirety of which is hereby incorporated by reference.

BACKGROUND

The present disclosure relates to a ventilation device, and more particularly, to methods and apparatuses for a ventilation nozzle for welding applications.

In various manufacturing industries, undesirable fumes and/or smoke may be a byproduct of the work environment. For example, in a welding environment, smoke may be generated during welding. The smoke may, for example, obscure the area being welded, which may prevent the welder from being able to see the welding process. This may lead to, for example, faulty welds.

Limitations and disadvantages of conventional approaches to a ventilation nozzle for welding applications will become apparent to one of skill in the art, through comparison of such approaches with some aspects of the present methods and apparatuses set forth in the remainder of this disclosure with reference to the drawings.

SUMMARY

Methods and apparatuses are provided for a ventilation nozzle for welding applications, substantially as illustrated by and described in connection with at least one of the figures, as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

The figures are not necessarily to scale. Where appropriate, similar or identical reference numbers are used to refer to similar or identical components.

DETAILED DESCRIPTION

Various applications and processes may benefit from removal of undesirable smoke generated in a welding environment. Accordingly, various aspects of the present disclosure provides for methods and apparatuses for example ventilation conduits for welding.

While it should be understood that various aspects of the disclosure may be used for different applications, example references in this disclosure will be made to a welding process.

Figure 1:
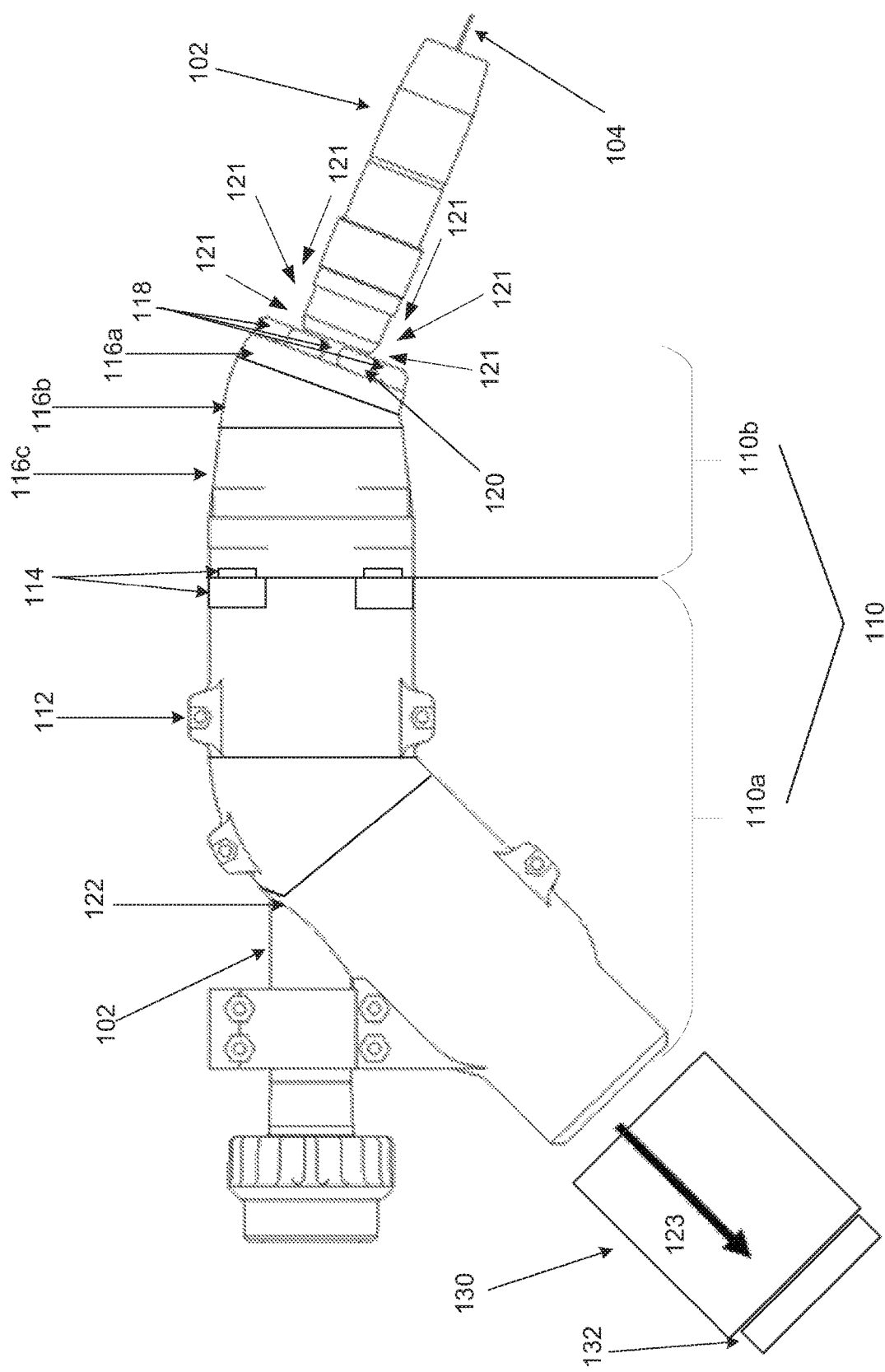
FIG. 1 illustrates a welding torch coupled with an example ventilation conduit, in accordance with aspects of this disclosure.

As can be seen in FIG. 1, there is shown an example welding torch 102 coupled to an example ventilation conduit 110. There is a welding electrode 104 protruding from the welding torch 102. The ventilation conduit 110 comprises a conduit body 110a and a conduit nozzle 110b. The conduit body 110a comprises one or more coupling points 112. There are also one or more mounting points 114 on the conduit body 110a and the conduit nozzle 110b. The conduit nozzle 110b comprises multiple sections such as, for example, a front section 116a, a middle section 116b, and a rear section 116c. Other examples of the disclosure may comprise different number of sections. In one example of the disclosure, the conduit nozzle 110b may be flexible.

In some examples, the conduit nozzle 110b is adjustable along its longitudinal axis to allow for a different angle of bend for different welding torches. For example, as shown in FIG. 1, the middle section 116b may be flexible so that the conduit nozzle 110b can be shaped to a desired angle. The various sections 116a, 116b, and 116c may also be fit such that the middle section 116b can move up or down with respect to the rear section 116c and/or the front section 116a.

Figure 2:
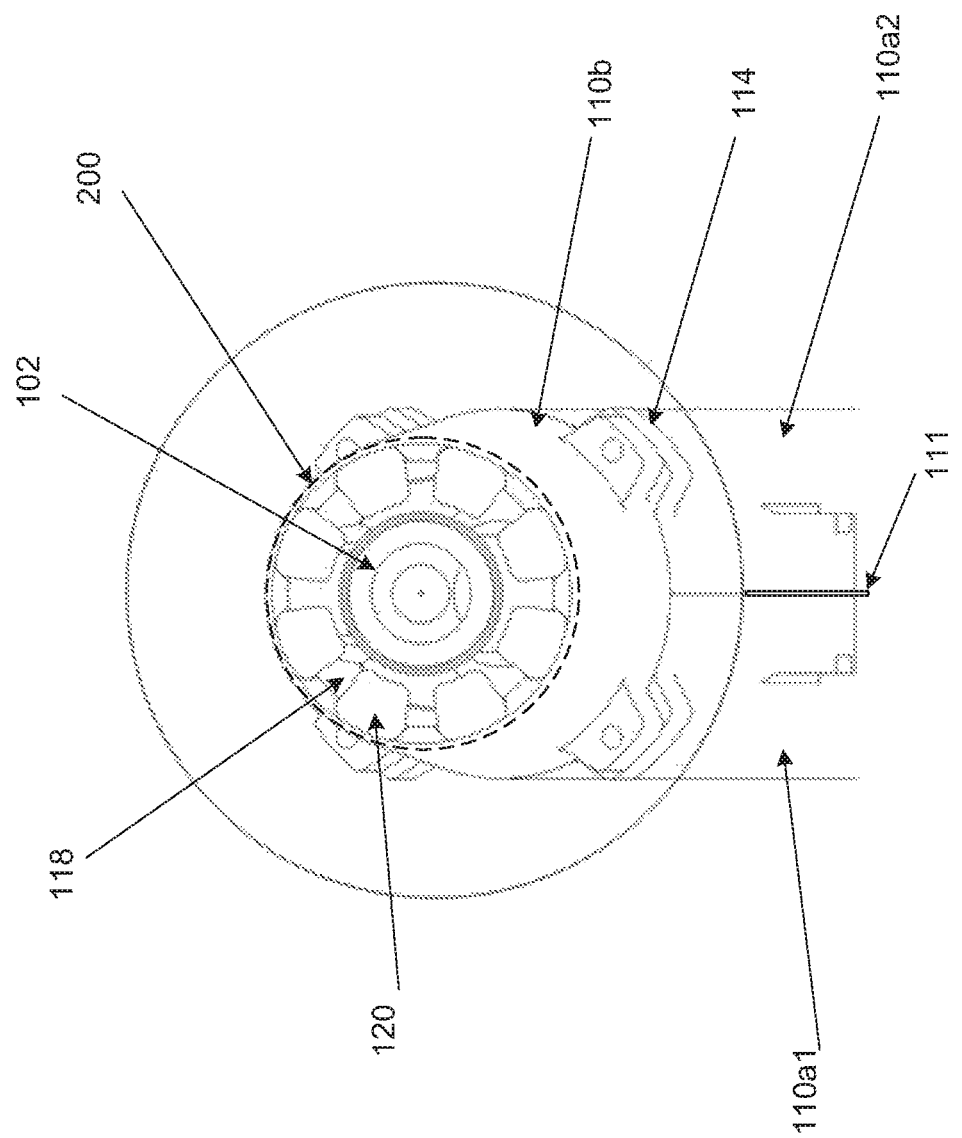
FIG. 2 illustrates a front view of the welding torch coupled with an example ventilation conduit shown in FIG. 1, in accordance with aspects of this disclosure.

The front section 116a comprises gaps 118 between tabs 120, which are also illustrated in FIG. 2. The gaps 118 and the tabs 120 may be said to be in a mouth 200 (FIG. 2) of the conduit nozzle 110b. The tabs 120 may be beveled, for example, to better allow intake air 121 to flow around the tabs 120 or through the gaps 118 from sides of the mouth 200 of the conduit nozzle 110b. The tabs 120 reduce a cross-section area of the mouth 200 of the conduit nozzle 110b through which the intake air 121 may enter the conduit nozzle 110b. The reduced cross-section area of the mouth 200 of the conduit nozzle 110b may provide for increased air flow speed with respect to a mouth 200 of the conduit nozzle 110b that does not have the tabs 118. The intake air 121 drawn into the conduit nozzle 110b is expelled as outflow air 123 at a rear portion of the ventilation conduit 110. The outflow air 123 may be pulled through an exhaust conduit 130 by, for example, a vacuum pump 132.

The conduit body 110a may also comprise an opening 122 that fits around an exterior of the welding torch 102. An example of the disclosure may comprise, for example, a seal (not shown) around the opening 122 such that air does not leak from the interior of the conduit body 110a or vice versa, where outside air leaks into the interior of the conduit body 110a. The conduit body 110a may comprise, for example, first and second pieces 110a1 and 110a2 (FIG. 2) longitudinally separated where the first and second pieces 110a1 and 110a2 may be coupled by coupling points 112. For example, a first coupling point on the first piece 110a1 may correspond to a second coupling point on the second piece 110a2. Accordingly, for example, a bolt and a nut may be used to couple the first coupling point to the second coupling point. As the various coupling points 112 are coupled together, the conduit body 110a can be securely coupled around an exterior of the welding torch 102, where the welding torch 102 enters the conduit body 110a through the opening 122.

The conduit nozzle 110b may be slid over the welding torch 102, and coupled to the conduit body 110a via the mounting points 114. The conduit nozzle 110b may be secured to the conduit body 110a using, for example, bolts and nuts. Accordingly, the conduit nozzle 110b may be replaced as it degrades with use, or the conduit nozzle 110b may be replaced with a different size conduit nozzle 110b that may be better suited for a particular application. For example, the conduit nozzle 110b may be longer or shorter and/or the conduit nozzle 110b may have different sized opening/area for air intake.

While nuts and bolts were described as being used for the coupling points 112 and the mounting points 114, various other coupling mechanisms may be used. For example, a screw or a bolt without a nut may be used, one or more clamps that goes around an exterior circumference of the ventilation conduit, a clip on one side of the coupling point 112/mounting point 114 that snaps into a corresponding recess of the other side of the coupling point 112/mounting point 114, etc.

The exhaust conduit 130 from the vacuum pump 132 may be flexible or rigid, or a combination of a flexible section(s) and a rigid section(s). For example, a flexible hose may be coupled to a rigid pipe.

Various examples of the disclosure may provide for at least a portion of the conduit nozzle 110b to be made of material that has a higher melting temperature than the conduit body 110a since the conduit nozzle 110b is closer to a welding arc of the welding torch 102. For example, the front section 116a of the conduit nozzle 110b may be made of different material than the rest of the conduit nozzle 110b and/or the conduit body 110a.

FIG. 2 shows an illustration of a front view of the welding torch 102 coupled with an example ventilation conduit 110. A front portion of the welding torch 102 is shown as being in the mouth 200 of the conduit nozzle 110b. There is shown the tabs 120 and the gaps 118 at the mouth 200 of the conduit nozzle 110b. There is also shown the mounting points 114 for mounting the conduit nozzle 110b to the conduit body 110a.

The conduit 110 further includes a seal 111 that may be placed along one or both edges of the first and second pieces 110a1 and 110a2 in some examples of the disclosure. The seal 111 is only shown on the bottom edges of the first and second pieces 110a1 and 110a2, however, the top edges of the first and second pieces 110a1 and 110a2 may also have a seal 111. The seals 111 may allow an air tight connection of the first and second pieces 110a1 and 110a2 in forming the conduit body 110a. The seals 111 may be made of flexible material or a non-flexible material. In an example of the disclosure, the seals 111 may be made of flexible material to allow the first and second pieces 110a1 and 110a2 to fit around different welding torches that may have different outer circumferences.

Figure 3:
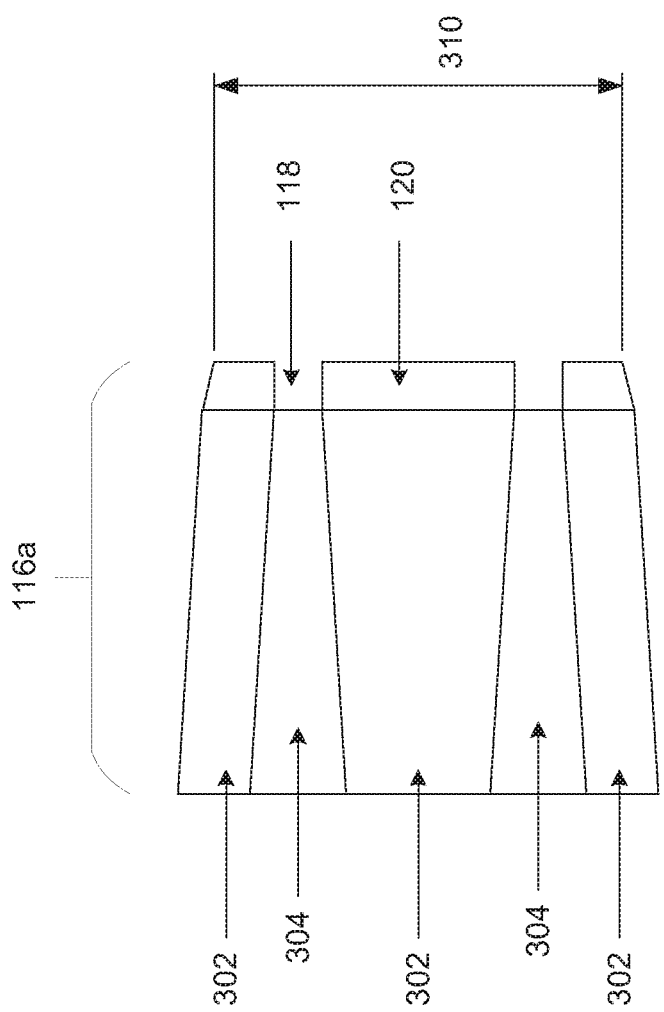
FIG. 3 illustrates an example ventilation conduit with an adjustable opening for air intake, in accordance with aspects of this disclosure.

As can be seen in FIG. 3, there is shown an illustration of an example front section 116a of the conduit nozzle 110b with an adjustable opening for air intake. For example, the front section 116a may comprise various parts 302 and 304, where the parts 302 and 304 may be adjusted to increase or decrease a diameter of the mouth 200 of the conduit nozzle 110b. In an example, the parts 302 may be moved closer toward each other to decrease the diameter 310, and the parts 302 may be moved farther from each other to increase the diameter 310. The parts 302 may be configured to slide over the parts 304. While a specific example is provided in FIG. 3, other designs may also be used.

Figure 4:
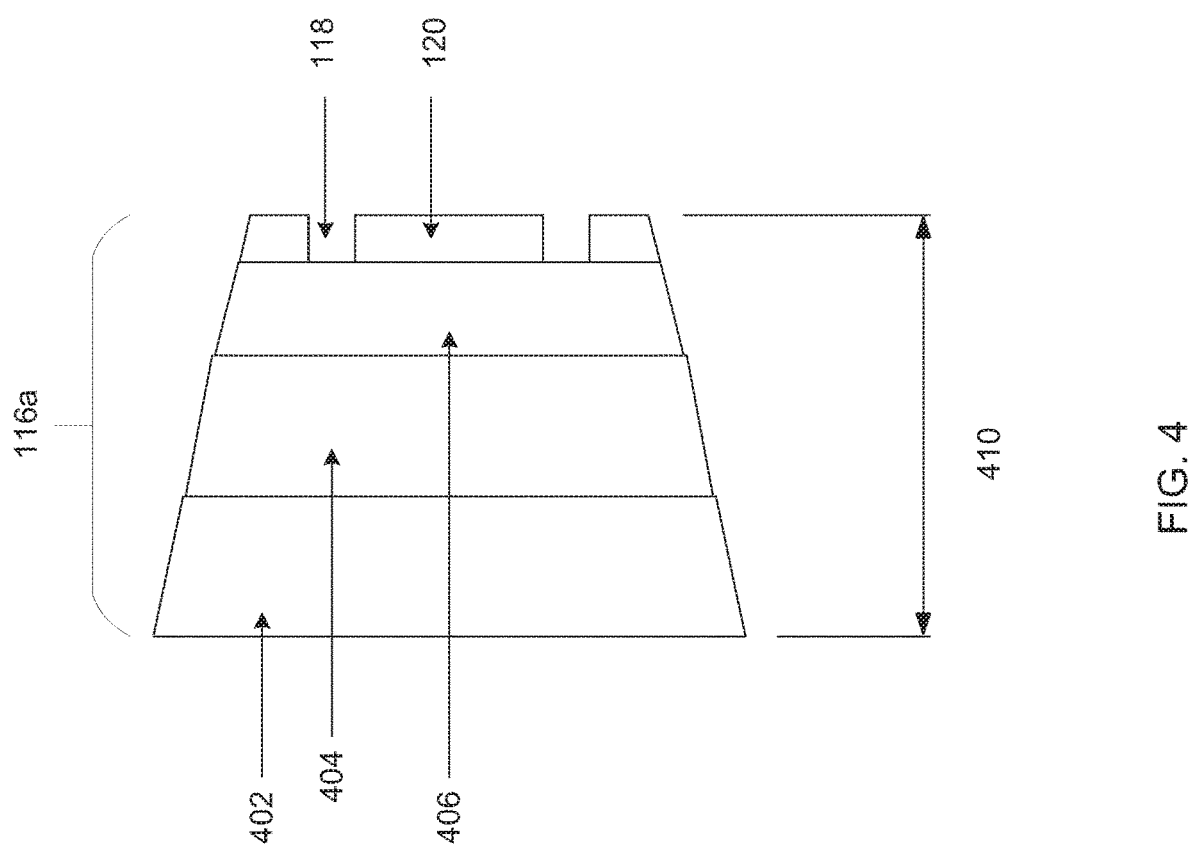
FIG. 4 illustrates an example ventilation conduit with an adjustable length, in accordance with aspects of this disclosure.

As can be seen in FIG. 4, there is shown an illustration of an example front section 116a of the conduit nozzle 110b with an adjustable length. For example, the front section 116a may comprise various parts 402, 404, and 406 that telescope to increase or decrease a length 410 of the front section 116a. In an example, the parts 402, 404, and 406 may be telescoped in to decrease the length 410, or telescoped out to increase the length 410. At the desired length, a section may be turned in a first direction to lock the length in place or turned in a second direction for length adjustment. While a specific example is provided in FIG. 4, other designs may also be used.

Some examples may combine aspects of FIGS. 3 and 4 to allow changing the diameter of the mouth 200 of the conduit nozzle 110b and/or the length of the conduit nozzle 110b.

Figure 5:
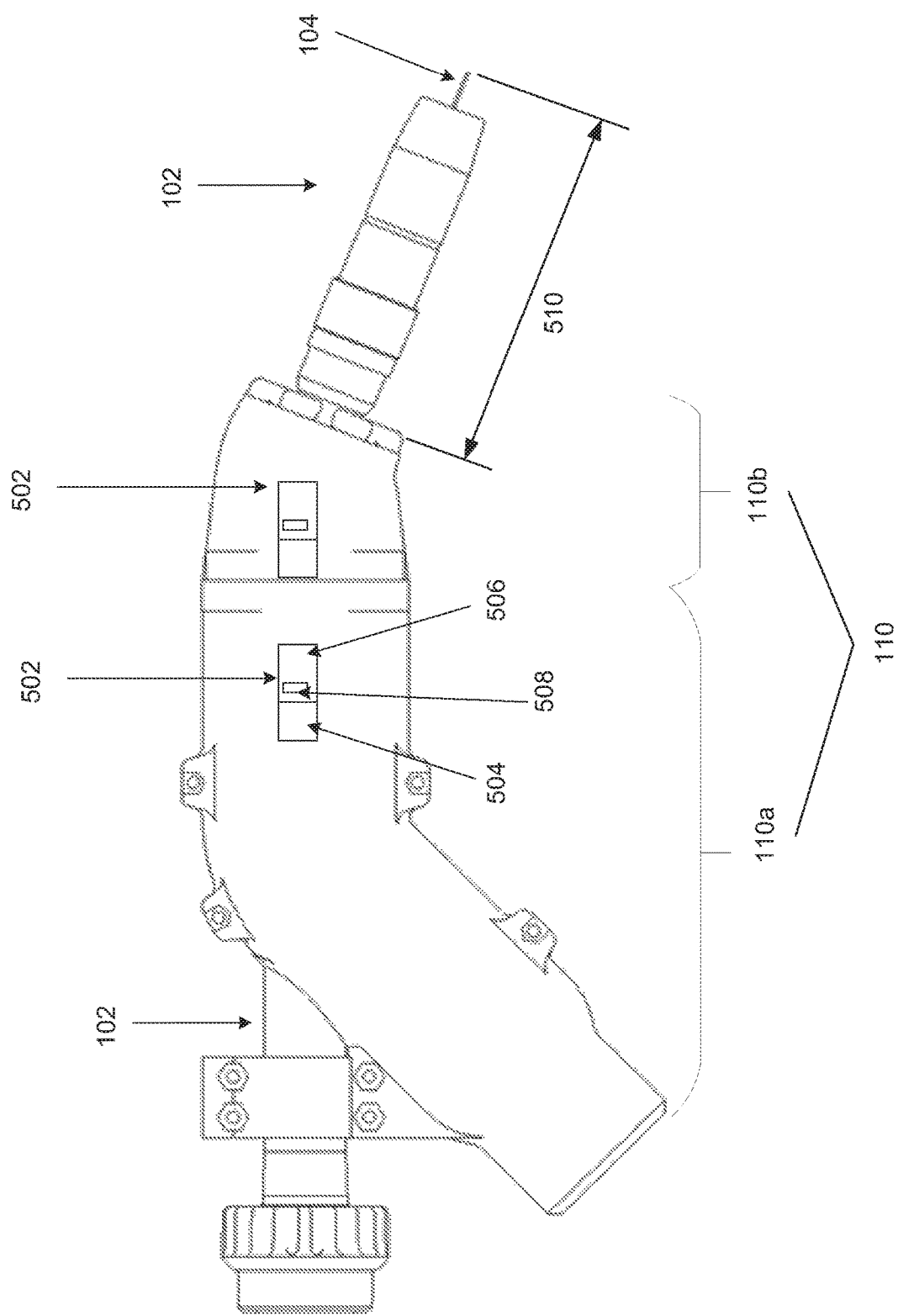
FIG. 5 illustrates an example ventilation conduit with air vents, in accordance with aspects of this disclosure.

FIG. 5 illustrates the example ventilation conduit 110 with air vents 502, where there may be one or more air vents 502 in the conduit body 110a and/or conduit nozzle 110b. The air vent 502 may have, for example, an opening 504 and a cover 506 with a handle 508. The handle 508 may allow a user to move the cover 506 to close the opening 504 completely or expose a portion or all of the opening 504.

Figure 6:
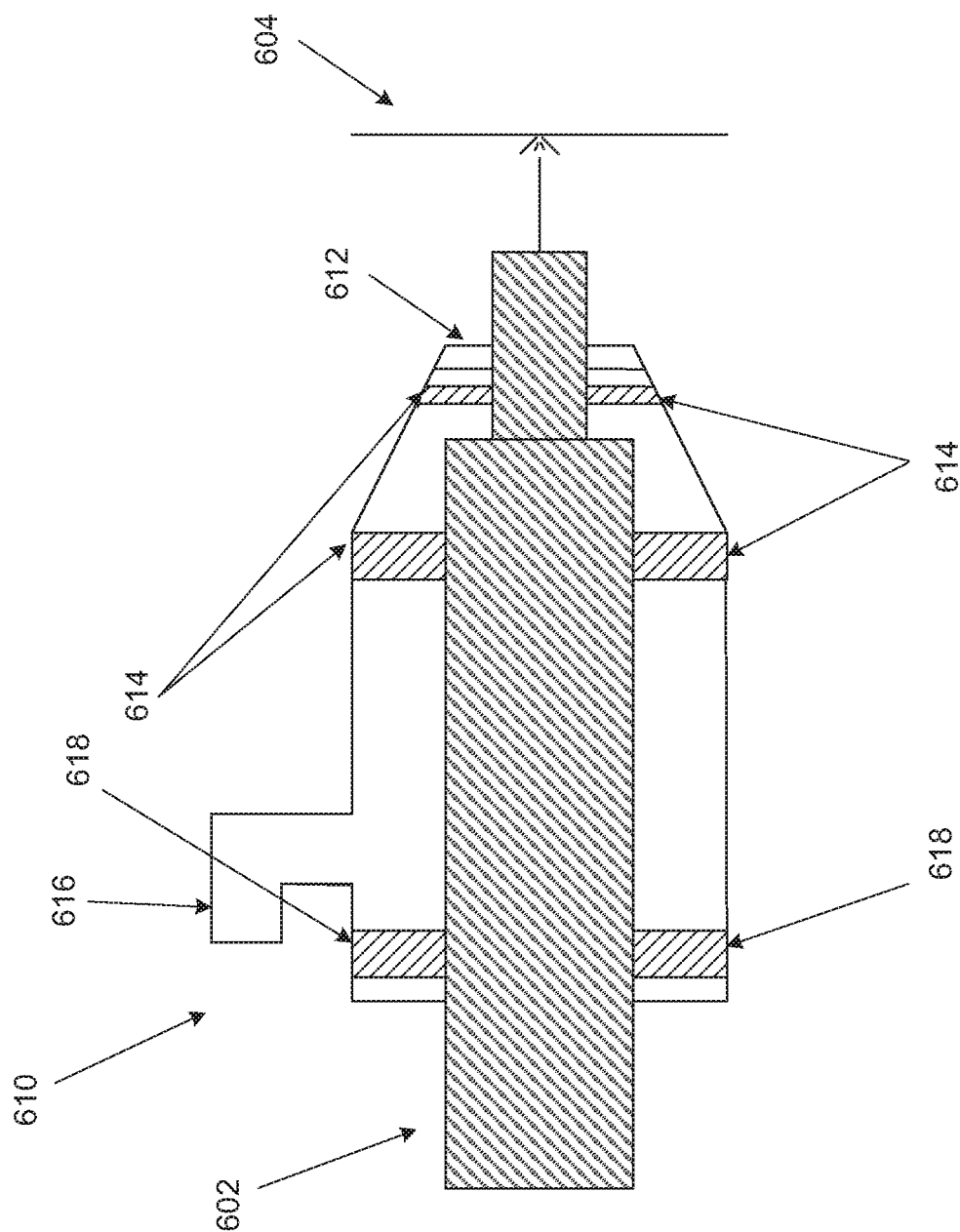
FIG. 6 illustrates a cross-section view of a welding torch coupled with an example ventilation conduit, in accordance with aspects of this disclosure.

FIG. 6 illustrates a cross-section view of a welding torch 602 coupled with an example ventilation conduit 610. There is also shown a workpiece 604. The ventilation conduit 610 may, for example, slide over the welding torch 602 rather than have multiple pieces couple together around the welding torch 602 as shown in previous figures. The ventilation conduit 610 may comprise, for example, a mouth 612 that is similar to the mouth 200 of the conduit nozzle 110b that has gaps 118 between tabs 120, where the tabs 120 are beveled.

The ventilation conduit 610 may also comprise internal offsets 614 and 618 to better position the ventilation conduit 610 over the welding torch 602. The internal offsets 614 and 618 may be made of flexible or non-flexible material. The air (smoke) may flow in through the mouth 612 and out the air outlet 616. The air (smoke) generated by welding the workpiece 604 may be pulled through an exhaust conduit 130 connected to the air outlet 616 by, for example, a vacuum pump 132.

The internal offsets 614 may be configured to allow air to flow past them out to the air outlet 616. For example, there may be discrete internal offsets 614 such that there is space between the discrete internal offsets 614. In another example, the internal offsets 614 may be one piece with openings in them. The internal offset 618, however, may need to be substantially air-tight so that all or most of the air coming in the mouth 612 exits via the air outlet 616. Accordingly, the internal offset 618 may be a single piece with no openings.

The ventilation conduit 610 may also be adjustable as described previously in FIGS. 1, 3, and/or 4. That is, the angle of the ventilation conduit 610 may be adjustable to have the ventilation conduit 610 bend at different angles including not having a bend, the diameter of the mouth 612 may be adjustable, and/or the length of the ventilation conduit 610 may be adjustable.

Figure 7:
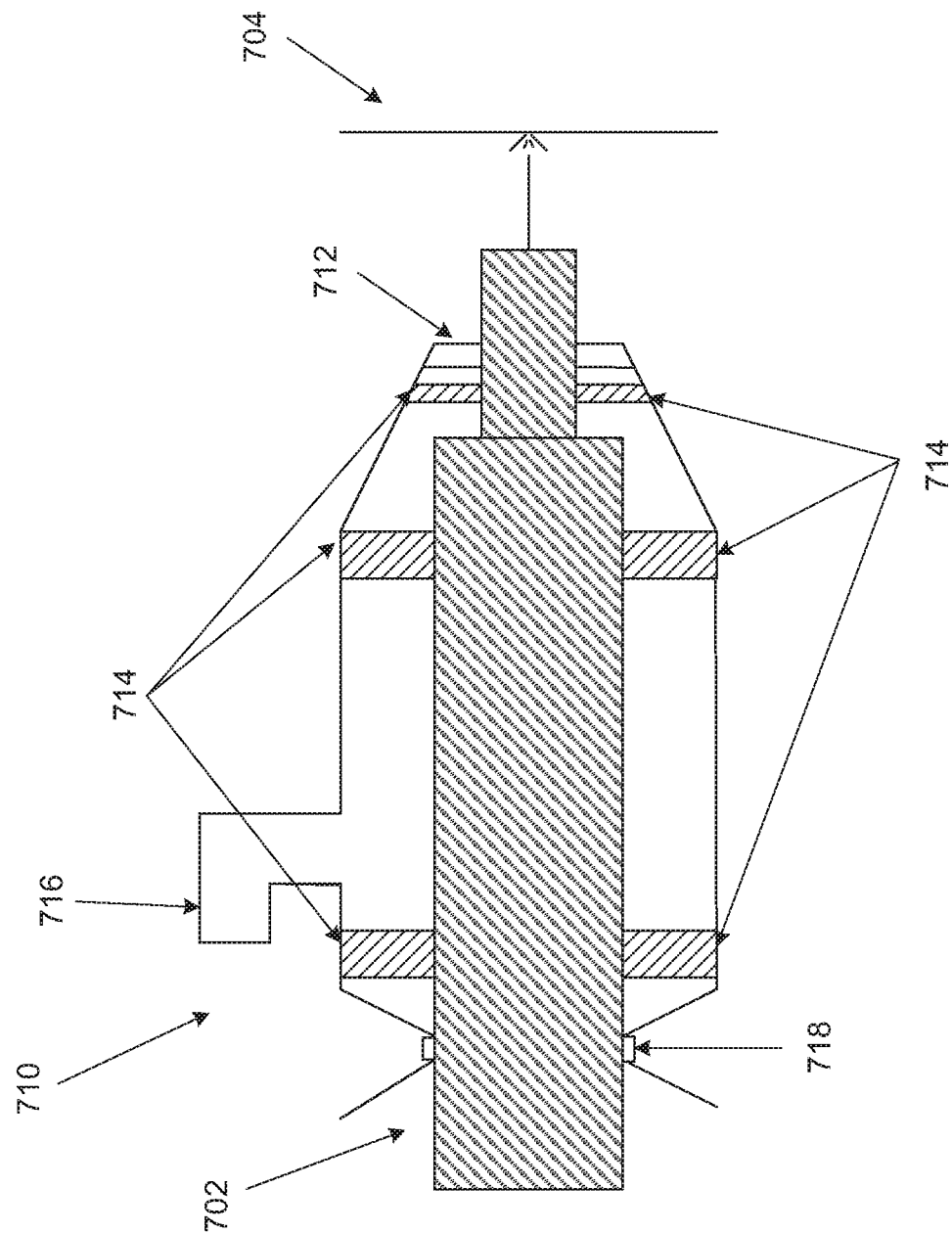
FIG. 7 illustrates a cross-section view of a welding torch coupled with another example ventilation conduit, in accordance with aspects of this disclosure.

FIG. 7 illustrates a cross-section view of a welding torch 702 coupled with an example ventilation conduit 710. The ventilation conduit 710 is similar to the ventilation conduit 610 except that the ventilation conduit 710 is closed off at the rear portion by a cinch 718. Accordingly, the internal offset 714 at the rear of the ventilation conduit 710 need not be air tight. The cinch 718 may be, for example, a clamp or any other suitable device for tightly coupling the ventilation conduit 710 to the welding torch 702.

Therefore, it can be seen that the present disclosure provides for a ventilation conduit for a welding torch, where the ventilation conduit comprises a conduit body having at least a first part and a second part, and a conduit nozzle. The at least the first part and the second part are configured to be removably coupled around an outside of a welding torch. The conduit nozzle, with a beveled first end to allow better air flow from the sides and a second end, is configured to be removably coupled by the second end to the conduit body.

The size of a mouth of the conduit nozzle and a length of the conduit nozzle are each adjustable. A mouth portion of the conduit nozzle comprises tabs to decrease a cross-section area for air flow into the conduit nozzle. The conduit nozzle may be removably snapped on to the conduit body. The ventilation conduit may comprise an air outlet configured to connect to an exhaust conduit.

At least one of the first part and the second part may comprise flexible sealing material for coupling the first part and the second part to different welding torches. The conduit nozzle may be adjustable along its longitudinal axis to allow an adjustable angle of bend for different welding torches. The conduit nozzle may be formed from material that has a higher melting temperature than material that forms the conduit body.

The ventilation conduit may comprise at least one closeable opening on one or both of the conduit nozzle and the conduit body, and a size of the at least one closeable opening may be adjustable.

The present disclosure also provides for a ventilation conduit for a welding torch that comprises a conduit body comprising at least a first part and a second part, where the at least the first part and the second part are configured to be removably coupled around an outside of the welding torch, and a mouth of the conduit body is beveled.

The mouth of the conduit body may comprise tabs to decrease a cross-section area for air flow into the conduit body. A size of the mouth of the conduit body may be adjustable and/or a length of the conduit body may be adjustable. At least one of the at least the first part and the second part may comprise flexible sealing material for coupling the first part and the second part to different welding torches.

The present disclosure additionally provides for a ventilation conduit for a welding torch that comprises a conduit body configured to be removably placed over an outside of the welding torch. The conduit body may comprise a plurality of internal offsets configured to make contact with an exterior surface of the welding torch, an air outlet, and a mouth of the conduit body where the mouth is beveled.

The mouth of the conduit body may comprise tabs to decrease a cross-section area for air flow into the conduit body. The air outlet may be between at least one of the internal offsets and the mouth of the conduit body, and the at least one of the internal offsets may be configured to provide a substantially air-tight seal between an interior surface of the conduit body and an exterior surface of the welding torch. The conduit body may comprise a cinch at a rear portion longitudinally opposite the mouth of the conduit body.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present methods and/or system have been described with reference to certain aspects of the disclosure, it will be understood by those skilled in the art that various changes may be made and equivalents may be substituted without departing from the scope of the present methods and/or systems. In addition, many modifications may be made to adapt a particular situation or material to the teachings of the present disclosure without departing from its scope. Therefore, the present methods and/or systems are not limited to any particular examples disclosed. Instead, the present methods and/or systems will include all implementations falling within the scope of the appended claims, both literally and under the doctrine of equivalents.

What are claimed:

1. A ventilation conduit for a welding torch, comprising:
   a conduit body comprising at least a first part and a second part; and
   a conduit nozzle,
   wherein:
      the at least the first part and the second part are configured to be removably coupled around an outside of a welding torch, and
      the conduit nozzle, with a first end that is beveled and a second end, is configured to be removably coupled by the second end to the conduit body,
      wherein a mouth portion of the conduit nozzle comprises tabs arranged around a circumference of the mouth portion to decrease a cross-section area for air flow into the conduit nozzle, adjacent ones of the tabs being separated by gaps to allow gas flow through the gaps.

2. The ventilation conduit of claim 1, wherein a size of a mouth of the conduit nozzle is adjustable.

3. The ventilation conduit of claim 1, wherein a length of the conduit nozzle is adjustable.

4. The ventilation conduit of claim 1, wherein the conduit nozzle is removably snapped on to the conduit body.

5. The ventilation conduit of claim 1, comprising an air outlet configured to connect to an exhaust conduit.

6. The ventilation conduit of claim 1, wherein at least one of the first part and the second part comprise flexible sealing material for coupling the first part and the second part to different welding torches.

7. The ventilation conduit of claim 1, wherein the conduit nozzle is adjustable along its longitudinal axis to allow an adjustable angle of bend for different welding torches.

8. The ventilation conduit of claim 1, wherein the conduit nozzle is formed from material that has a higher melting temperature than material that forms the conduit body.

9. The ventilation conduit of claim 1, comprising at least one closeable opening on one or both of the conduit nozzle and the conduit body.

10. The ventilation conduit of claim 9, wherein a size of the at least one closeable opening is adjustable.

11. A ventilation conduit for a welding torch, comprising:

a conduit body comprising at least a first part and a second part, wherein:

the at least the first part and the second part are configured to be removably coupled around an outside of the welding torch, a mouth of the conduit body is beveled, and the mouth of the conduit body comprises tabs arranged around a circumference of the mouth to decrease a cross-section area for air flow into the conduit body, adjacent ones of the tabs being separated by gaps.

12. The ventilation conduit of claim 11, wherein a size of the mouth of the conduit body is adjustable.

13. The ventilation conduit of claim 11, wherein a length of the conduit body is adjustable.

14. The ventilation conduit of claim 11, wherein at least one of the at least the first part and the second part comprises flexible sealing material for coupling the first part and the second part to different welding torches.

15. A ventilation conduit for a welding torch, comprising:

a conduit body configured to be removably placed over an outside of the welding torch, wherein the conduit body comprises:

a plurality of internal offsets configured to make contact with an exterior surface of the welding torch; and an air outlet; and wherein a mouth of the conduit body is beveled, and the mouth of the conduit body comprises tabs arranged around a circumference of the mouth to decrease a cross-section area for air flow into the conduit body, adjacent ones of the tabs being separated by gaps.

16. The ventilation conduit of claim 15, wherein:

the air outlet is between at least one of the internal offsets and the mouth of the conduit body, and the at least one of the internal offsets is a substantially air-tight seal between the interior of the conduit body and the exterior of the welding torch.

17. The ventilation conduit of claim 15, wherein the conduit body comprises a cinch at a rear portion longitudinally opposite the mouth of the conduit body.

\* \* \* \* \*